April 23, 1957 R. E. DOBRATZ 2,789,691
MOUSETRAP PACKAGE
Filed May 26, 1955
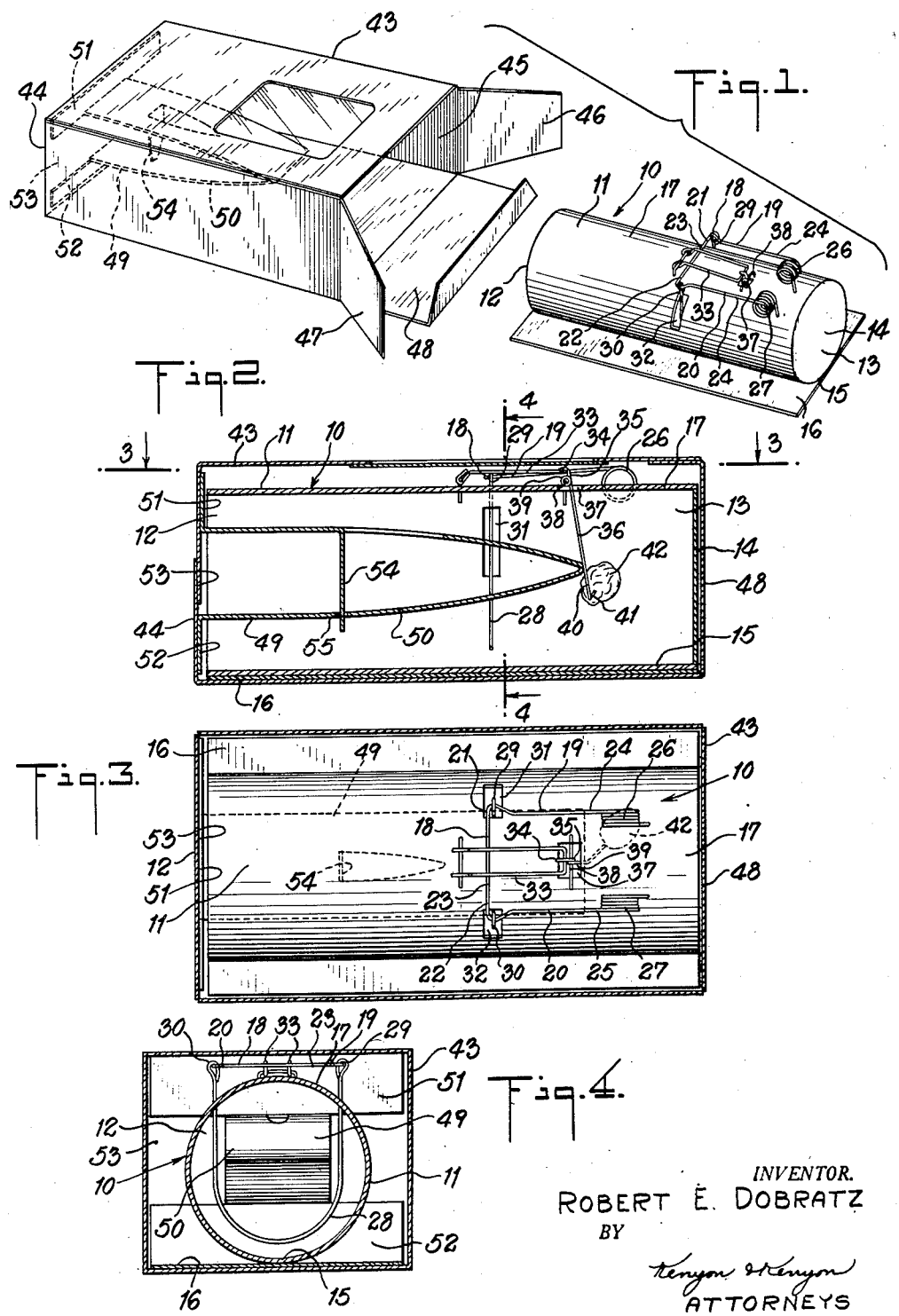
INVENTOR.
ROBERT E. DOBRATZ
BY
Kenyon & Kenyon
ATTORNEYS

2,789,691

MOUSETRAP PACKAGE

Robert E. Dobratz, Plantsville, Conn.

Application May 26, 1955, Serial No. 511,162

5 Claims. (Cl. 206—46)

This invention relates to a packaged mousetrap, and more patricularly to a pre-baited, pre-set, disposable mousetrap which is packaged in a container which maintains the trap in a "set" condition during merchandizing and handling and ready for immediate use upon removal therefrom.

It is a well-known fact that many persons, especially women, are squeamish about mousetraps and are afraid to bait and set such devices because of the danger of premature release of the trap if improperly set, with consequent possible injury to the fingers and hands. Furthermore, after a mouse has been caught in a trap, it is an unpleasant job to remove the dead mouse, and it endangers the health to handle the trap for baiting and setting during reuse.

The present invention provides a merchandizing package which eliminates the above-mentioned disadvantages. The trap is properly baited and set by the manufacturer. All that need be done by the user is to remove the trap from the container and put it in place on the floor or wherever desired for catching a mouse. In addition, since the body of the trap can be made of a cheap material such as cardboard or the like, it is possible to sell the trap at a low price so it can be thrown away after one use.

In view of the above, it is apparent that an object of this invention is to provide a packaged pre-baited, pre-set mousetrap.

Another object is to provide such a mousetrap which may be thrown away after one use.

Still another object is to provide a container for a pre-set mousetrap which will maintain such mousetrap in a "set" condition during merchandizing and handling and ready for immediate use upon removal therefrom.

Other objects and features will become apparent in the following written description, and in the drawings in which:

Fig. 1 shows the mousetrap and container unassembled;

Fig. 2 shows a longitudinal elevational section of the mousetrap and container as assembled;

Fig. 3 shows a partially sectionalized plan view of the mousetrap and container as assembled taken on line 3—3 of Fig. 2;

Fig. 4 shows a partially sectionalized end view of the mousetrap and container as assembled, taken along line 4—4 of Fig. 2.

In Fig. 1 are shown the component parts of the present invention. The mousetrap 10 has a tubular or cylindrical housing 11 which is adapted to receive a mouse at an open end 12, the other end 13 being closed by a cap or cover 14. The said housing is affixed along its bottom 15 to a flat rectangular base plate 16. Mounted on the top 17 of said housing is a wire frame 18 having a pair of opposed sides 19, 20 longitudinally disposed on said housing and joined at one pair of ends 21, 22 by a transverse member 23. At the other pair of ends 24, 25 of said sides 19, 20 are coil springs 26, 27 respectively which connect the said sides to the top of the housing and bias the said frame for movement in a clockwise direction as viewed in Fig. 1.

Located within said housing is a wire loop or choker means 28 which has ends 29, 30 that extend through respective slots 31, 32 in the housing and connect to the respective ends 21, 22 of the said frame (see also Figs. 3 and 4). The frame, due to the aforementioned biassing by coil springs 26, 27, transmits to the choker means an upward bias as viewed in Fig. 4.

A pivotally mounted latch 33 is disposable across the transverse member 23 when the latter is held adjacent the top of the housing against the spring bias and said latch is releasably engaged by a catch 34 on the upper end 35 of a vertical tripping wire or releasing means 36 to hold said transverse member in such position, i. e., a "set" condition, until the tripping wire is moved to release the said catch. The tripping wire 36 is centrally disposed within said housing and extends upwardly through slot 37 in the housing to permit the said catch to make the above-described engagement. A transverse wire 38 is disposed through a loop 39 in the tripping wire 36 adjacent said catch and is affixed across the latter slot 37 to the housing to provide a pivotal connection for the tripping wire.

At the lower end 40 of the tripping wire is a hook or other bait-holding means 41 to hold the mouse-luring bait 42.

The casing or container 43 is of a generally rectangular shape and of sufficient size to receive and enclose the above-described trap so that the latter will not jiggle or move around inside the casing during handling. The casing has a closed end 44 and an open end 45 with related lateral sealing flaps 46, 47 and a lid 48. Mounted within said casing is a detent means 49 which is comprised of a folded strip 50 attached at its ends 51, 52 to the inside surface 53 of the said closed end 44 and thus defines an elongated protuberance extending longitudinally within said casing from said latter end. A flap 54 can be partially cut from one portion of said strip and bent so as to extend into an adjacent slit 55 in the other portion of the strip to give greater strength and rigidity to the said protuberance. The attachment of the strip to the closed end of the casing can be such that the strip is removable with moderate force.

The casing 43 and the housing 11 and base plate 15 can be constructed of cardboard or other suitable material having sufficient strength yet being relatively inexpensive.

When assembled the package is arranged as shown in Fig. 2 with the detent means extending into the open end 12 of the said tubular housing 11 and bearing against the tripping wire adjacent the bait-holding means, thereby preventing catch-actuating, i. e., trap-releasing, pivotal movement of the tripping wire in a clockwise direction as viewed in Fig. 2.

When the container is opened and the trap is removed for use, the tripping wire is then free to move clockwise, and when a mouse enters the housing and pulls at the bait 42, the tripping wire is so moved, which causes catch 34 to release latch 33, and consequently frame 18 is rotated clockwise by its coil springs 26, 27 and pulls choker means 28 up against the top of the housing squeezing the mouse caught within its loop. The body of the mouse will lie substantially entirely within the said housing. At this point the detent means can be pulled out of the casing and discarded, the mouse-holding trap can be placed in the said casing and enclosed, and the entire package disposed of as desired.

If it is desired to have a trap release means which will operate by a mouse pushing on the tripping wire rather than pulling it, it is obvious that a mere rearrangement of parts is necessary. In such a case the trap would be inserted in the container in reverse, i. e., the closed end first. A small access hole would have to be cut into the cap to admit the detent means, but not big enough to admit a mouse. Such a trap could be placed in a mouse run without bait, if desired, and the release means would be tripped by a mouse running into the tripping wire.

While only one embodiment of this invention has been shown and described, it is obvious that those skilled in the art could make certain changes and additions without departing from the scope and spirit of the invention.

I claim:

1. A package comprising a pre-set mousetrap including a tubular housing adapted to receive a mouse, spring actuated choker means within said housing for entrapping a mouse, bait-holding means located within said housing for holding bait, mouse-luring bait attached to said bait-holding means, catch means attached to said bait-holding means for releasably holding said choker means in a "set" condition until said catch means is actuated by movement of said bait-holding means; a casing removably disposed about said mousetrap; detent means attached within said casing for preventing movement of said bait-holding means during merchandizing and handling of said packaged mousetrap and until removal of said trap from said casing for use.

2. A package comprising a pre-set mousetrap including a tubular housing adapted to receive a mouse, spring actuated choker means within said housing for entrapping a mouse, bait-holding means located within said housing for holding bait, mouse-luring bait attached to said bait-holding means, catch means attached to said bait-holding means for releasably holding said choker means in a "set" condition until said catch means is actuated by movement of said bait-holding means; a casing removably disposed about said mousetrap; detent means attached within said casing and being disposed within said housing for preventing catch-actuating movement of said bait-holding means until said trap is removed from said casing for use.

3. A package comprising a casing, a pre-set mousetrap removably disposed within said casing and including a tubular housing adapted to receive a mouse at one end, spring actuated choker means within said housing for entrapping a mouse, bait-holding means located within said housing for holding bait, mouse-luring bait attached to said bait-holding means, catch means attached to said bait-holding means for releasably holding said choker means in a "set" condition until said catch means is actuated by movement of said bait-holding means; detent means removably attached within said casing and being disposed within said end of said housing for preventing catch-actuating movement of said bait-holding means until said trap is removed from said casing for use.

4. A package comprising a casing a pre-set mousetrap removably disposed within said casing and including a tubular housing adapted to receive a mouse, spring actuated choker means within said housing for entrapping a mouse, bait-holding means located within said housing for holding bait, mouse-luring bait attached to said bait-holding means, catch means attached to said bait-holding means for releasably holding said choker means in a "set" condition until said catch means is actuated by movement of said bait-holding means; detent means attached within said casing and being disposed within said housing for preventing catch-actuating movement of said bait-holding means until said trap is removed from said casing for use, said detent means comprising a folded strip removably attached at its ends to said casing and defining an elongated protuberance extending therefrom.

5. A merchandizing package comprising a casing a pre-set mousetrap removably disposed within said casing said mousetrap pre-set including a tubular housing adapted to receive a mouse, spring actuated choker means within said housing for entrapping a mouse, tripping means located within said housing, catch means attached to said tripping means for releasably holding said choker means in a "set" condition until said catch means is actuated by movement of said tripping means, mouse-luring bait attached to said tripping means; detent means attached within said casing and being disposed within said housing for preventing catch actuating movement of said tripping means until said trap is removed from said casing for use, said detent means comprising an elongated member attached at one end to said casing and in contact with said tripping means at its other end.

References Cited in the file of this patent

UNITED STATES PATENTS

| Number | Name | Date |
|---|---|---|
| 465,056 | Edwards | Dec. 15, 1891 |
| 677,108 | Weis | June 25, 1901 |
| 1,042,042 | Seeley et al. | Oct. 22, 1912 |
| 1,899,641 | Schwartz et al. | Feb. 28, 1933 |
| 1,950,908 | Stone et al. | Mar. 13, 1934 |
| 2,034,809 | Grant | Mar. 24, 1936 |
| 2,157,954 | Gould | May 9, 1939 |
| 2,631,724 | Wright | Mar. 17, 1953 |